United States Patent [19]

Douglas

[11] 4,200,367
[45] Apr. 29, 1980

[54] PROJECTOR

[75] Inventor: Lawrence M. Douglas, South Easton, Mass.

[73] Assignee: Polaroid Corporation, Cambridge, Mass.

[21] Appl. No.: 901,604

[22] Filed: May 1, 1978

[51] Int. Cl.² .................. G03B 21/10; G03B 21/20
[52] U.S. Cl. ........................................ 353/78; 353/87
[58] Field of Search ................. 353/71, 74, 75, 76, 353/77, 78, 103, 108, 113, 114, 122, 85, 86, 87, 27 R, 79; 362/97, 413

[56] References Cited
U.S. PATENT DOCUMENTS

| 2,389,087 | 11/1945 | Schubert | 353/76 |
|---|---|---|---|
| 2,473,736 | 6/1949 | Stern | 353/76 |
| 2,704,486 | 3/1955 | Wilson | 353/78 |
| 3,388,249 | 6/1968 | Siegel et al. | 362/413 |
| 3,716,293 | 2/1973 | Kitano et al. | 353/103 |
| 3,720,462 | 3/1973 | Dali et al. | 353/27 R |
| 3,751,153 | 8/1973 | Naito | 353/27 R |
| 3,904,286 | 9/1975 | Omi et al. | 353/71 |
| 4,030,821 | 6/1977 | Badalich | 353/71 |

FOREIGN PATENT DOCUMENTS

| 897098 | 5/1944 | France | 353/113 |
|---|---|---|---|
| 1153094 | 9/1957 | France | 362/413 |
| 252816 | 11/1948 | Switzerland | 353/71 |

*Primary Examiner*—John W. Shepperd
*Attorney, Agent, or Firm*—Alfred E. Corrigan

[57] ABSTRACT

A projector for a film transparency having a first housing for enclosing an image transmitting system and a second housing having an open end through which the illumination from a projection bulb supported within the second housing is adapted to pass. The first and second housings are adjustably coupled to each other such that when they are located in juxtaposed position the illumination from the bulb is directed into the first housing so as to project an image of the transparency film along an optical path defined by the transmitting system onto a rear projection screen mounted in one wall of the first housing. When the two housings are spaced from each other, the illumination from the lamp may be advantageously utilized for nonphotographic purposes, e. g., reading. Preferably, the rear projection screen is pivotally mounted to the first housing such that it may be moved out of alignment with the optical path thereby enabling the image to be projected onto a remote viewing surface.

5 Claims, 9 Drawing Figures

PROJECTOR

BACKGROUND OF THE INVENTION

1. Field of the Invention

This invention relates to projectors for projecting an image of an object onto a viewing surface by passing light through the object for the purpose of more conveniently viewing the image of the object.

2. Description of the Prior Art

Projectors as such are generally well known and usually include a concentrated light source, a light paralleling element, e.g., a condensing lens, a holding or positioning device for the object to the projected, an objective for directing the light after it passes through the object to form an image, and possibly a screen or surface for receiving the projected image. The screen may be of the rear projection type or it may be remotely situated relative to the main projector housing. In order to increase the versatility of the projector some have modified the conventional projector such that the projected image may be seen on a screen which is enclosed by the projector housing or alternatively the image may be projected onto a screen which is remotely located relative to the projector housing. For examples of the latter type of projector reference may be made to U.S. Pat. Nos. 4,030,821 and 3,904,286. However, upon completion of the viewing of the projected images, the versatility of the projector comes to an end, i.e., it just sits there waiting to be stored away for another time.

SUMMARY OF THE INVENTION

The instant invention relates to a projector of the type where the projected image may be viewed on a screen which is mounted on the main housing of the projector or on a remotely located screen. More specifically, the versatility of the projector is enhanced by locating the projector's source of illumination in an open ended housing which is separate from the main housing of the projector. The open ended housing is adapted to be moved into juxtaposition with the main housing so as to provide the illumination for projecting an image of an object onto a viewing screen, and, when projection of images has been terminated, may be readily moved away from the main housing to a position wherein the source of illumination may be utilized for reading.

In a preferred embodiment of the invention, the main housing of the projector includes an upwardly extending open ended section which encloses a pair of condensing lenses. Also mounted within the main housing are three mirrors and a projection lens which define an optical path along which they function to transmit the image of an object onto a rear projection screen. The rear projection screen is preferably pivotally coupled to the main housing for movement out of the optical path such that the image may then be projected onto a distant screen or wall. Mounted immediately below the condensing lenses in a film unit supporting and positioning structure. In the preferred embodiment, this structure is adapted to receive a transparent film unit having six discrete images therein such that one of the discrete images is supported in alignment with the axes of the condensing lenses and with the optical path. After the first discrete image has been projected, a lever is actuated to move the film supporting structure from a first to a second position in which a second discrete image is located in position for projection. Subsequent to the viewing of the second discrete image, the lever is actuated to again reposition the film unit relative to the optical path. During this latter movement, the supporting structure is reciprocated back into its original or first position and the positioning structure moves the film unit relative to the supporting structure until a third discrete image is located in position for projection. This series of movements continues until all six discrete images in the film unit have been viewed. After the sixth image has been viewed, the film unit, which at this time is substantially protruding from the main housing, may be removed from the supporting and positioning structure.

The projector includes a second housing for supporting a projection bulb such that a substantial portion of its illumination is directed through an open end of the second housing. The second housing is connected to the main housing by a flexible tubing similar to a BX cable having suitable electrical wiring therein which is connected to the socket for the projector's bulb. The flexibility of the tubing enables one to move the second housing from a projection position in which the upwardly extending portion of the main housing is telescopically received by the open end of the second housing and the projection bulb is located above and in alignment with the axes of the condensing lenses, to a position spaced from the main housing wherein the illumination from the bulb may be used for reading.

In an alternative embodiment of the invention, the projector is modified so as to be adapted for use with 35 mm type slide transparencies. The modification includes providing the main housing with a slide chamber on opposite sides of the upwardly extending section which houses the condensing lenses. A slide changing mechanism is provided for sequentially moving slides in one of the chambers into alignment with the axes of the condensing lenses for projection of its image and then into the other chamber.

An object of the invention is to provide a projector with a movably mounted source of illumination such that it may be moved between a projection position and a reading position thereby enhancing the utility of the projector.

Another object of the invention is to provide a projector of the type described with a novel structure for sequentially locating discrete images on a single film unit in position for projection.

Still another object of the invention is to provide a projector of the type described with a simple and inexpensive means for projecting an image of an object onto either a rear projection screen or a screen which is spaced from the projector.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
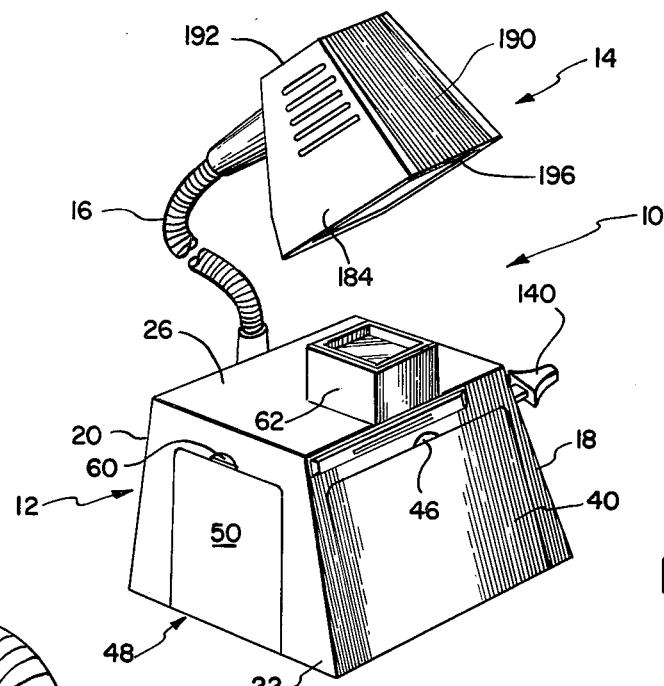
FIG. 1 is a perspective view of a preferred embodiment of a projector of the instant invention, the projector being shown with its source of illumination in a reading position.
Figure 2:
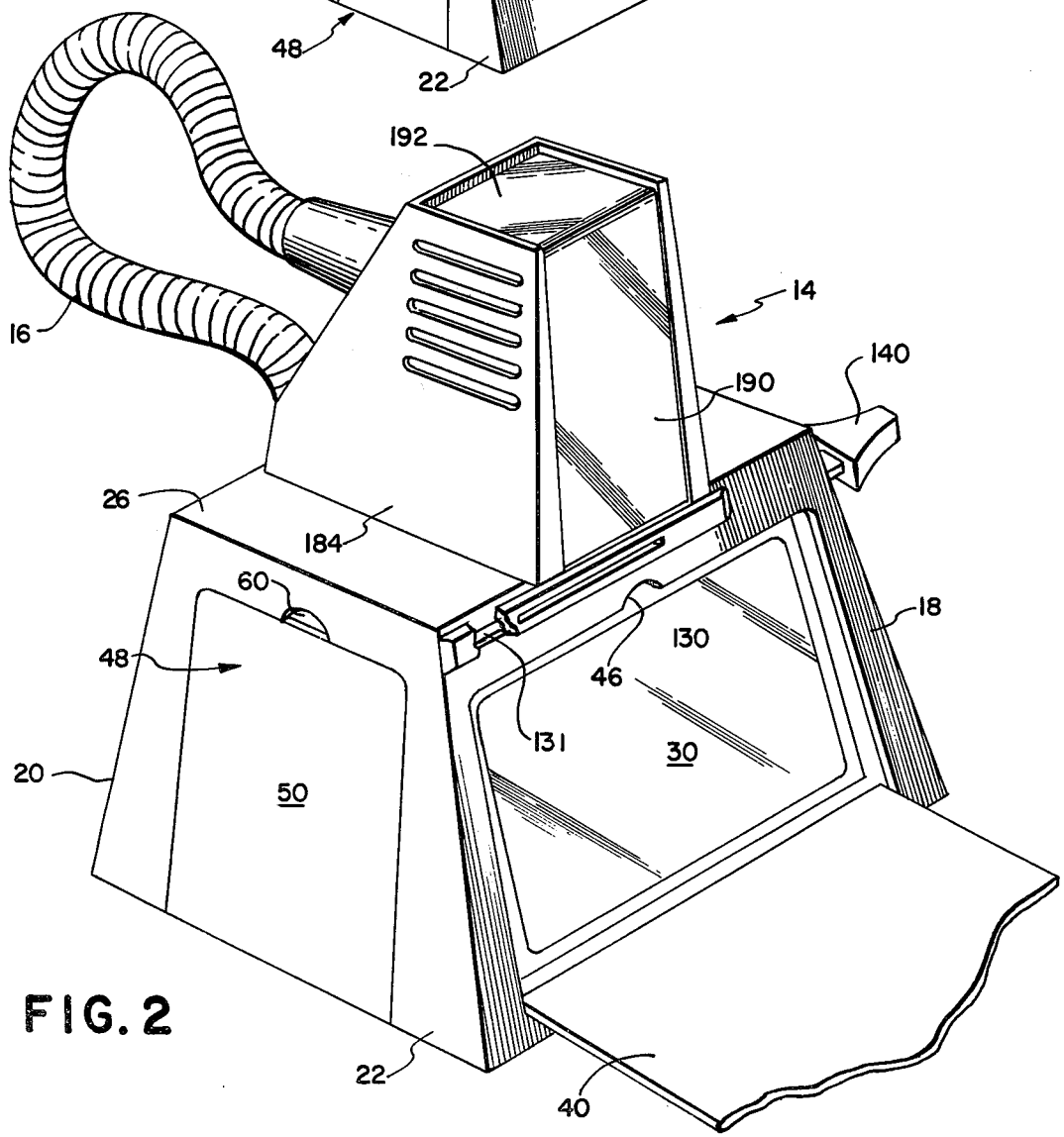
FIG. 2 is an enlarged perspective view of the projector with its source of illumination shown in a projection position.

Reference is now made to FIGS. 1 and 2 of the drawings wherein is shown a preferred embodiment of a projector 10 which incorporates the instant invention. The projector 10 includes a first or main housing 12, a second housing 14, and means in the form of a flexible tube 16 for supporting the second housing 14 in spaced relation to the first or main housing 12, as shown in FIG. 1, where the projector now functions as a "gooseneck" type of reading lamp.

The first or main housing 12 includes front and rear walls 18 and 20 which are connected to each other by a pair of side walls 22 and 24, a top wall 26 and a botton wall 28. A rear projection screen 30 is pivotally mounted at its lower end within the front wall 18 by a hinge pin 32 whose opposite ends extend into aperture 34 located in each of two laterally spaced partitions 36 and 38. Also mounted within the front wall 18 is a door 40. The door 40 is provided with a hinge 42 the opposite ends of which extend into apertures 44 in each of the partitions 36 and 38. The front wall 18 includes a half moon shaped recess 46 into which a finger may be inserted to engage the top edges of the door 40 and the rear projection screen 30 to facilitate pivoting them into their open or horizontal positions.

Figure 4:
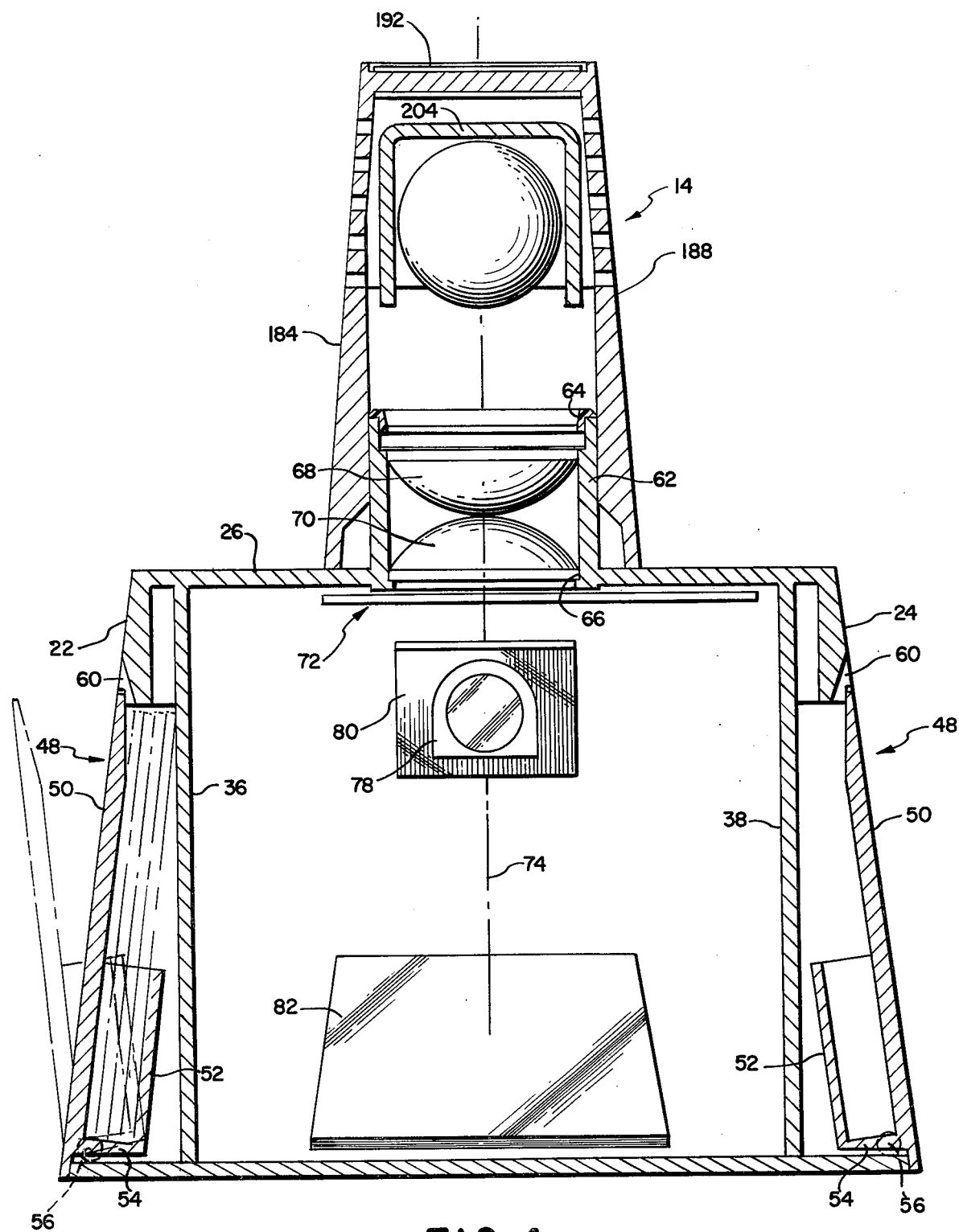
FIG. 4 is a front elevational view of the projector taken along the line 4—4 in FIG. 3.

Pivotally mounted within each of the side walls 22 and 24 is a door 48 comprised of an outer wall 50, an inner wall 52 and a botton interconnecting wall 54. Each door 48 includes an integral hinge pin 56 at its lower edge for pivotally connecting it to its respective side wall 22 and 24. As shown in FIG. 4, each door 48 functions as a storage chamber for a plurality of film units 58, shown in broken lines. A half moon shaped recess 60 in each wall 22 and 24 provides a means for facilitating the movement of each of the doors into their open position.

Figures 3, 3A:
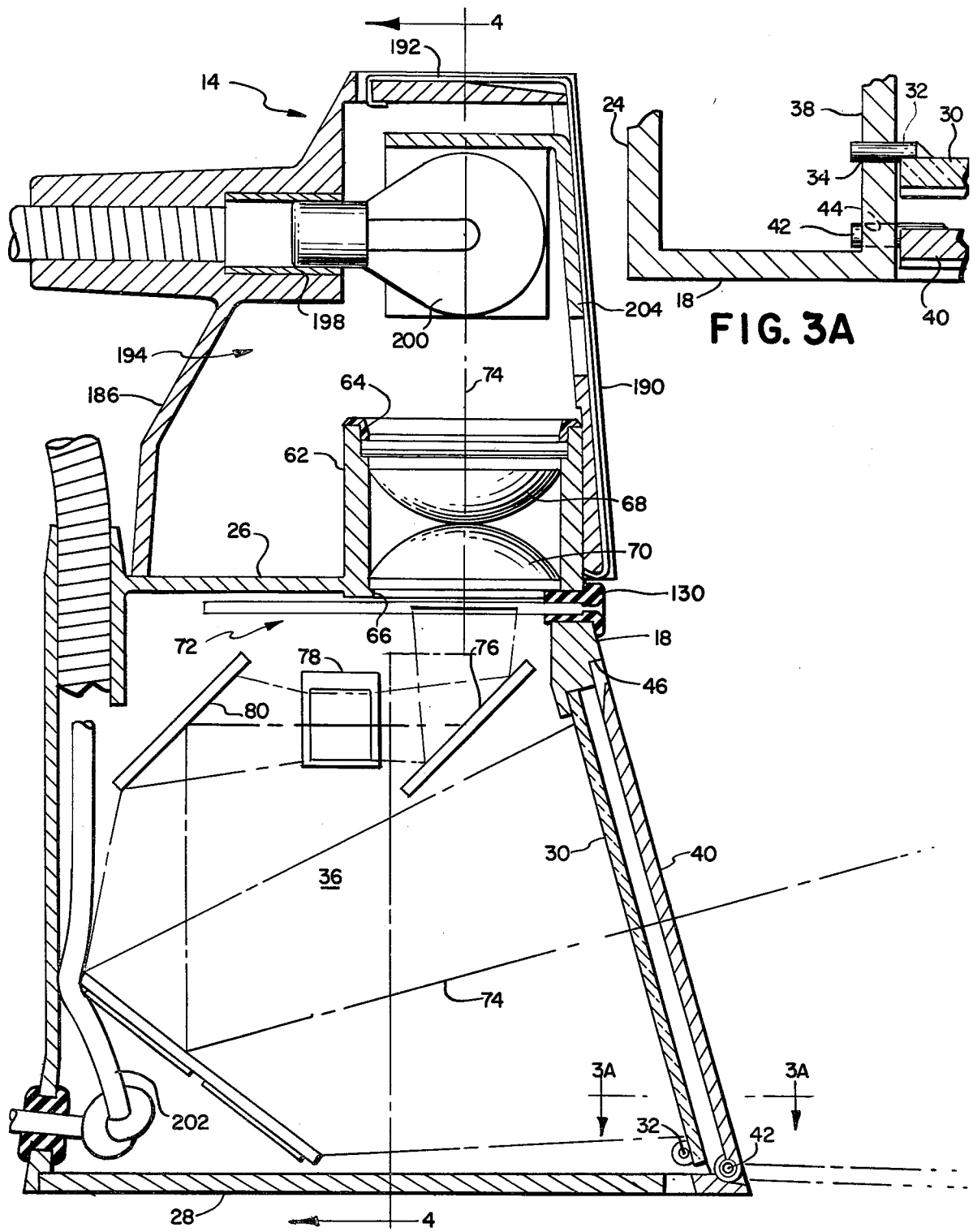
FIG. 3 is a side elevational view in crosssection of the projector shown in FIG. 2.
FIG. 3A is an enlarged view of a section of FIG. 3 taken along the line 3A—3A in FIG. 3.

Extending upwardly from the top wall 26 of the main housing 12 is a rectangularly shaped section 62 having open ends 64 and 66. The section 62 is adapted to house a pair of condensing lenses 68 and 70, which lenses function in their well known manner to direct the light from the projector's light source so that it impinges on the surface of a film unit perpendicular to its plane so as to uniformly illuminate the image to be projected. The light passes through the open end 66 of the section 62 and through a film unit located in a projection position by a film supporting and positioning structure diagrammatically shown at 72 in FIG. 3. From the projection position the image is then transmitted along a focal path having a folded axis 74. The means for transmitting the image include a mirror 76, an adjustable projection lens 78, and mirrors 80 and 82. From the mirror 82, the image is directed onto the rear projection screen 30 or, if the screen 30 has been pivoted into its open position, onto a distant screen or wall for viewing.

Figure 5:
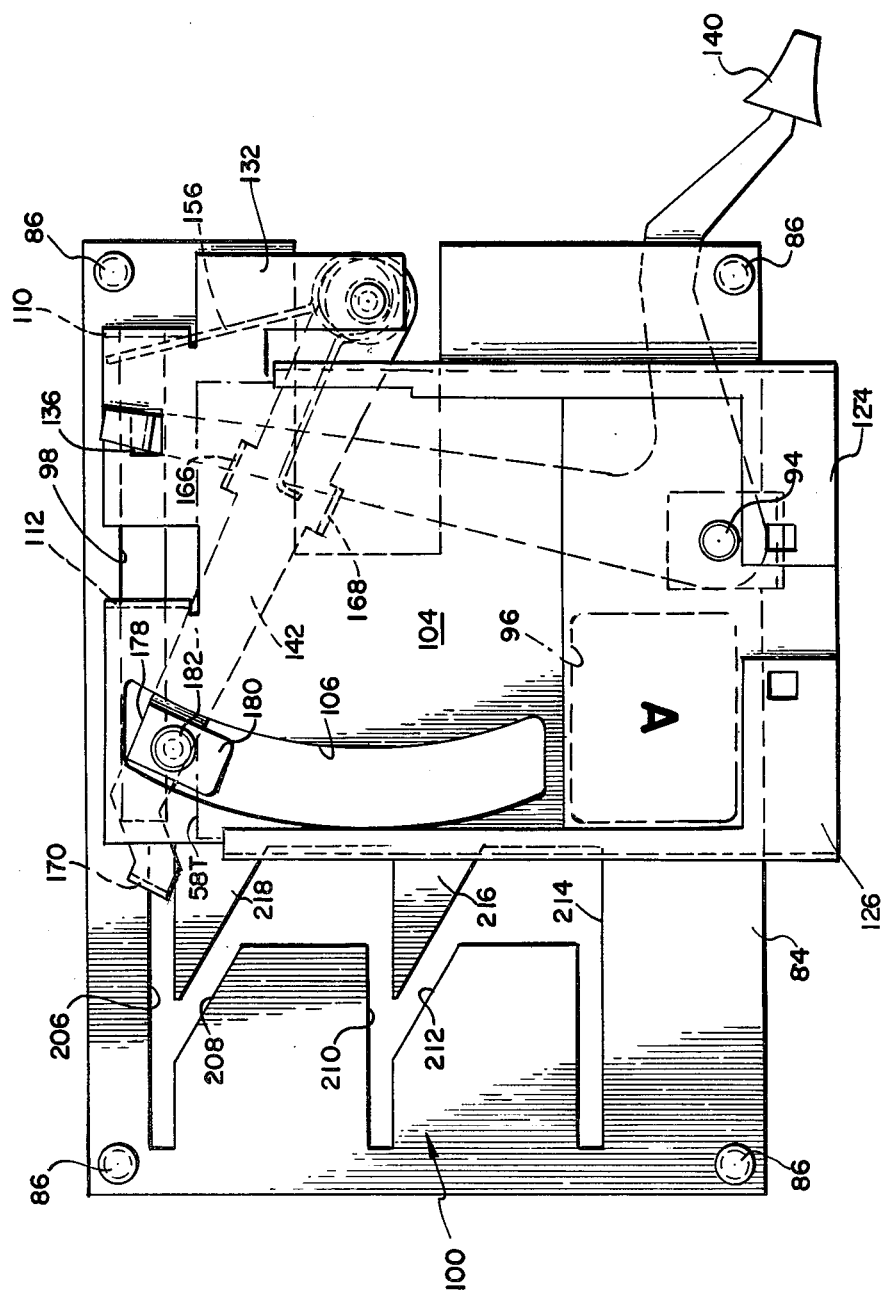
FIG. 5 is an enlarged top elevational view of the projector's film supporting and positioning structure shown with a film unit located therein.
Figure 6:
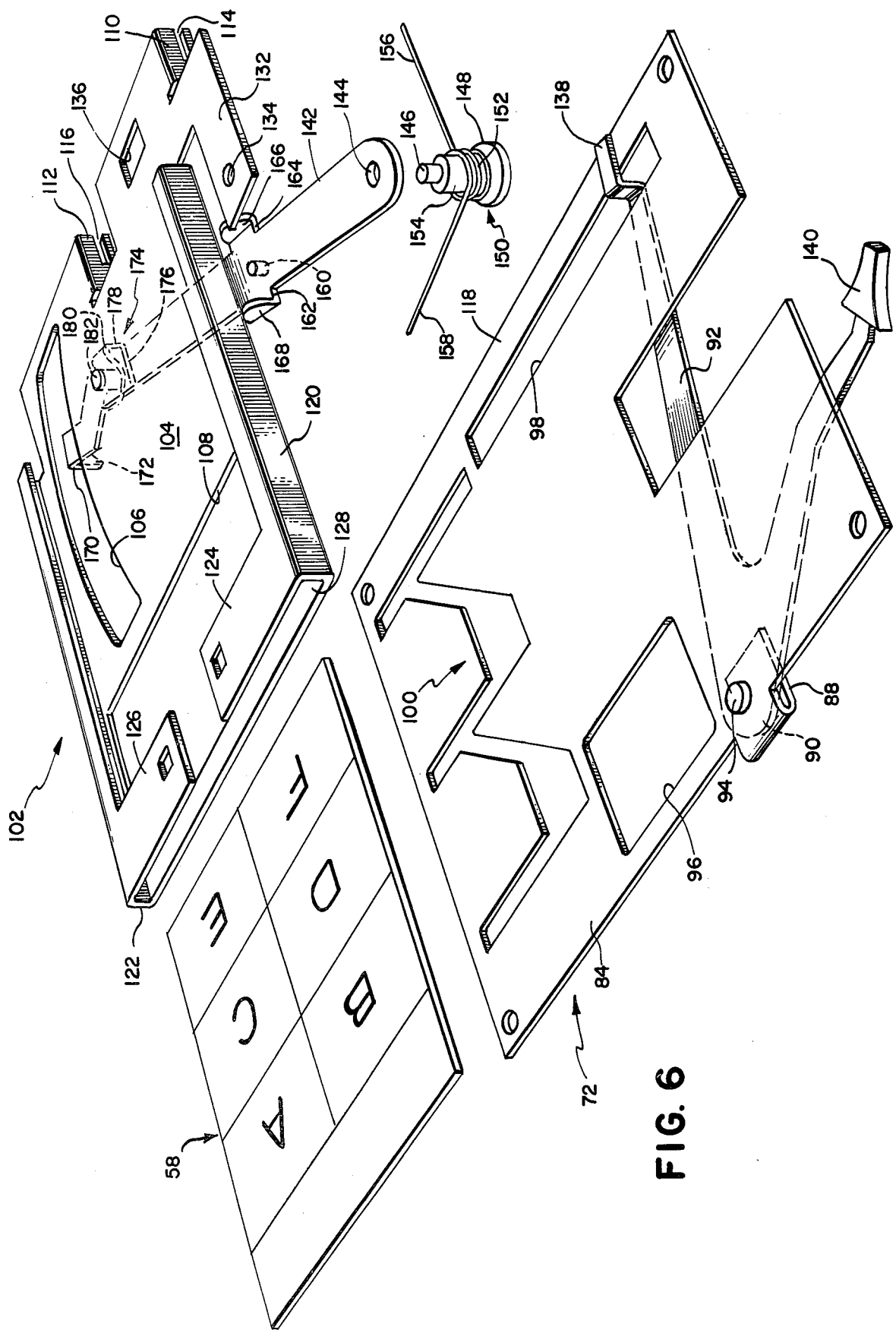
FIG. 6 is an exploded perspective view of the film supporting and positioning structure with a film unit about to be inserted into one of the members.

Reference is now made to FIGS. 5 and 6 of the drawings wherein is shown the projector's film supporting and positioning structure 72. Specifically, this structure includes a plate 84 which is suitably secured in place by a plurality of rivets 86. The plate 84 includes a tab 88 which is folded under the main portion of the plate 84 to form a bite for receiving one end 90 of a manually actuatable crank 92. A rivet 94 extends through the tab 88, the end 90, and the plate 84 for pivotally coupling the crank 92 to the underside of the plate 84. The plate 84 also includes an aperture 96 whose configuration is substantially the same as that of one of the discrete images A, B, C, D, E and F in the film unit 58, an elongate slot 98 and a cam track 100.

Mounted above the plate 84 is a film support means or film unit holder 102 which includes a bottom wall 104 having an arcuate slot 106 and a generally rectangular opening 108 therein. The rear end of the botton wall 104 includes two downwardly turned flanges 110 and 112 each of which has a slot 114 and 116 therein. The slots 114 and 116 provide a means for slidably mounting and predeterminely spacing the film unit holder 102 to the plate 84 in that they are adapted to receive the portion 118 of the plate 84 which defines the right side of the elongate slot 98. Extending upwardly from the botton wall 104 are a pair of side walls 120 and 122 which are spaced from each other by a distance substantially equal to the width of the film unit 58. A pair of L-shaped flanges 124 and 126 extend from the side walls 120 and 122 inwardly toward each other so as to define an open end 128 through which the film unit 58 may be inserted into the film holder 102. The open end 128 of the film holder is supported by a member 130 which is slidably supported within a slot 131 having a greater width than the member 130 (see FIG. 2). The film holder 102 is completed by an outwardly extending flange 132 having a hole 134 therein and an aperture 136. The aperture 136 is adapted to receive an upwardly and outwardly bent end portion 138 of one of the arms of the crank 92 which has previously been threaded through the elongate slot 98 in the plate 84. Accordingly, it can be seen that manual movement of the arm 140 of the crank 92 is transmitted to the film unit holder 102 via the upwardly and outwardly end 138 to move the holder 102 in a transverse manner relative to the plate 84.

The film supporting and positioning structure also includes an arm 142 having an opening 144 in one end thereof which is adapted to rotatably receive a reduced end diameter 146 of a pin 148 for pivotally mounting the arm 142 to the flange 132 via the hole 134. The arm 142 is resiliently biased in a counterclockwide direction by a spring 150 whose intermediate portion 152 encircles an intermediate portion 154 of the pin 148. The spring 150 includes a lower arm 156 which is adapted to be mounted in engagement with the flange 110 and an upper arm 158 which is adapted to be mounted in engagement with the right side of a stud 160 which extends downwardly from the arm 142, as viewed in FIG.

6. Intermediate the ends of the arm 142 are a pair of outwardly extending flanges 162 and 164 having upturned half moon shaped ends 166 and 168 which are adapted to be mounted in engagement with the underside of the buttom wall 104 of the film holder 102. The arm 142 extends between the plate 84 and the film holder 102 and terminates in a downwardly turned cam track follower 170 having an inclined surface 172. The cam track follower 170 is adapted to follow the cam track 100 is a manner to be described hereinafter.

Mounted adjacent the free end of the arm 142 and extending upwardly therefrom is a clip-like member 174 comprised of a flange 176 for securing the clip-like member 174 to the arm 142, an upturned portion 178 and a horizontally extending undulating portion 180. A pin 182 extends through the portion 180 and the flange 176 for securing the clip-like member to the arm 142 and for maintaining a predetermined gap between the portion 180 and the flange 176. The height of the upwardly portion 178 is sufficient to locate the clip-like member 174 within the arcuate slot 106 such that at least a portion of the pin 182 and the lower surface of the undulating portion 180 are located above the upper surface of the botton wall 104, as viewed in FIG. 6.

Referring back to FIGS. 1 through 4 of the drawings, the second housing 14 includes a plurality of side walls 184, 186, 188 and 190 interconnected at their upper edges by a top wall 192 to define a chamber 194 having an open end 196. The wall 186 includes a socket 198 for receiving a projection bulb 200. Preferably the bulb 200 is 30 watts and its socket 198 is connected to an outlet by an electrical cord 202, a portion of which extends through the flexible cable or tube 16. A reflector 204 is mounted within the chamber for reflecting light from the bulb 200 through the open end 196.

OPERATION OF THE PREFERRED EMBODIMENT

In the operation of the instant invention the various components of the projector 12 are in the positions shown in FIG. 2 and the various elements of the film supporting and positioning structure (assuming that a film unit 58 has been fully inserted into the film holder 102) are located as shown in FIG. 5. The illumination from the bulb 200 is directed through the open end 64 of the section 62, through the condensing lenses 68 and 70 and the discrete image A of the film unit 58. The image of A is then transmitted through the aperture 96 in the plate 84 and onto the mirror 76 which in turn redirects the image through the projection lens 78 and onto the mirror 80. The image is again redirected by the mirror 80 onto the mirror 82 which then directs it onto the rear projection screen 30 or, alternatively, if the screen 30 is in its horizontal position, onto a distant screen or wall. Obviously, if the image is to be projected onto a remote screen or wall the film unit 58 would be turned over such that the discrete image area B would be located in alignment with the aperture 96 so as to correct the image from left to right. After the discrete image A has been viewed on the rear projection screen 30, the arm 140 is grasped by the user to rotate the crank 92 in a counterclockwise direction. This action enables the upwardly and outwardly turned end 138 of the crank 92 to move the film unit holder 102 to the left, as viewed in FIG. 5, until the flange 112 reaches the left hand end of the elongate slot 98, thereby locating the discrete image area B in alignment with the aperture 96. As the film unit holder 102 moves to the left, the cam track follower 170 moves within a leg 206 of the cam track 100 until it reaches another leg 208 at which point the arm 142 is pivotaed a few degrees in a counterclockwise direction into the leg 208 by the bias of the arm 158 of the spring 150. However, as the film unit holder 102 continues its leftward movement the cam track follower 170 moves along a wall of the leg 208 until it again enters the leg 206 near its closed or left hand end . It will be noted that during the movement of the cam track follower 170 into and out of the leg 208, the trailing end 58T of the film unit is maintained in engagement with the pin 182 thereby preventing at this time longitudinal movement of the film unit relative to the film unit holder 102. The prevention of this movement at this time is necessary in order to insure the correct alignment between the discrete image area B and the aperture 96. It is accomplished by setting the distance between the top surface of the botton wall 104 and the lowermost surface of the undulating portion 180 of the clip-like member 174 at a value slightly less than the thickness of the portion of the film unit underlying the portion 180 thereby releasably retaining the film unit in position relative to the pin 182. After the image area B has been viewed on the rear projection screen 30, the arm 140 is manually pivoted about 94 in a clockwise direction to reciprocate the film unit holder 102 toward the right until it reaches the position shown in FIG. 5. At this point further movement to the right is prevented by the engagement of the flange 110 with the right hand end of the elongate slot 98. During the latter movement of the film unit holder to the right, the cam track follower 170 moves along the leg 206 until it reaches the leg 208. The spring 150 now urges the follower 170 into and along the leg 208 until it comes to a stop near the right hand end of a third leg 210. As the follower 170 moves from the leg 206 to the leg 210 via leg 208, the clip-like member 174 on the arm 142 moves the film unit 58 longitudinally relative to the film unit holder until the discrete image area C is located in alignment with the aperture 96. In other words, the arm 142 functions as a means for positioning the film unit relative to the film unit holder or supporting means 102. After the image area C has been viewed, the crank 92 is again rotated in a counterclockwise direction thereby moving the film unit holder 102 to the left until the flange 112 bottoms out in the elongate slot 98. The discrete image area D is now located in alignment with the aperture 96. Leftward movement of the film unit holder results in the follower 170 moving along the third leg 210 until it reaches and is biased into a fourth leg 212. Continued movement to the left cams the follower 170 back into the leg 210. Subsequent to the viewing of the discrete image area D, the crank is again actuated to move the film unit holder to the right thereby moving the follower 170 along the leg 210, into and along the fourth leg 212 until it comes to a rest near the right hand end of a fifth leg 214. This latter movement is accompanied by the pivoting of the arm 142 in a counterclockwise direction thereby again moving the film unit in a longitudinal direction relative to the film unit holder until the discrete image area E is located in alignment with the aperture 96. After viewing the image area E on the screen 30, the crank is again actuated to move the film unit holder 102 to the left thereby causing the follower 170 to move toward the closed end of the leg 214 while simultaneously locating the discrete image area F in alignment with the aperture 96. At this point, approximately two-thirds of the card is protuding from the projector 12 and it may be readily removed after the image area F has been viewed.

Upon completion of the viewing of the image area F, the crank 92 is pivoted in a clockwise direction to return the film unit holder 102 to the position shown in FIG. 5. At this time the film unit 58 may be removed and another film unit 58 inserted into the film unit holder 102. As the latter film unit is being inserted through the open end 128 of the film unit holder 102, its trailing end 58T enters the bite of the clip-like member 174 and engages the pin 182 thereby pivoting the arm 142 back into the position shown in FIG. 5. During this movement of the arm 142, the inclined surface 172 of the cam track follower 170 facilitates the movement of the follower 170 over the sections 216 and 218 of the plate 84 as it returns to the position shown in FIG. 5. At this time, it should be noted that the spring 150 not only applies a biasing force on the arm 142, which force is generally parallel with the plane of the plate 84, but it also applies an upward force to the pivoted end of the arm 142 which continually urges the cam track follower 170 into the legs of the cam track 100. Specifically, the spring 150 is a compression spring whose upward bias on the pivoted end of the arm 142 is translated to a downward bias on the follower 170 by reason of the engagement between the half moon shaped members 166 and 168 and the underside of the botton wall 104 of the film unit holder 102.

Figure 7:
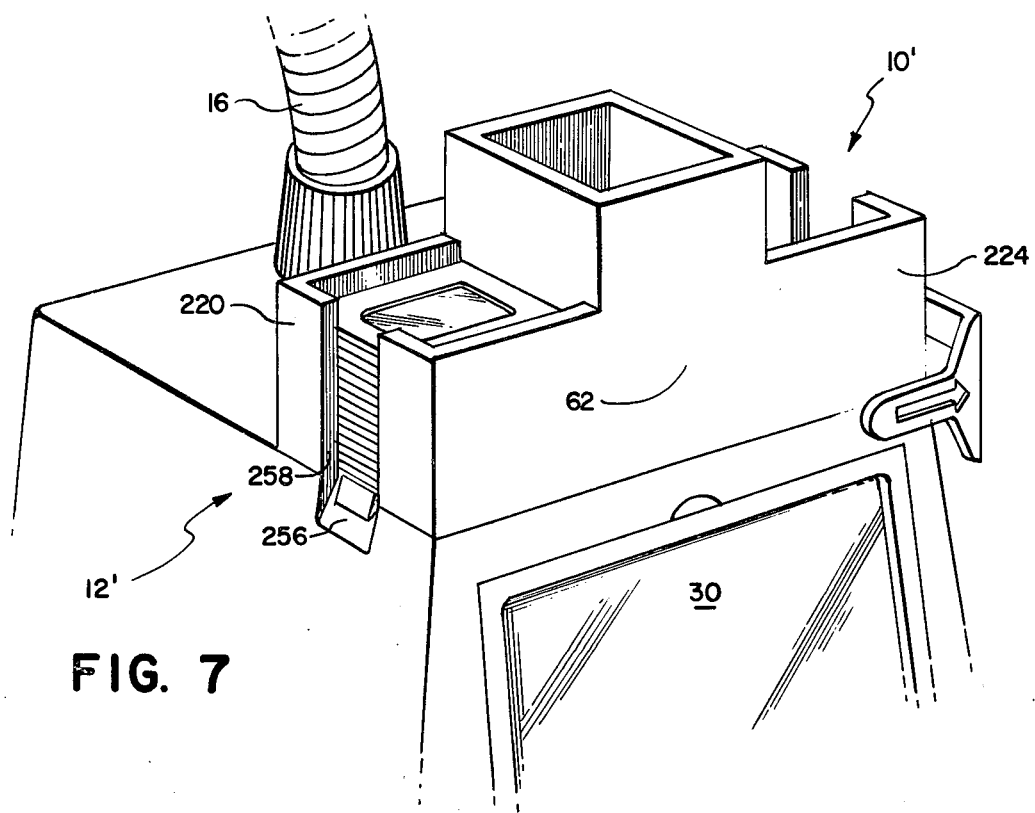
FIG. 7 is a perspective view of a portion of an alternative embodiment of a projector.
Figure 8:
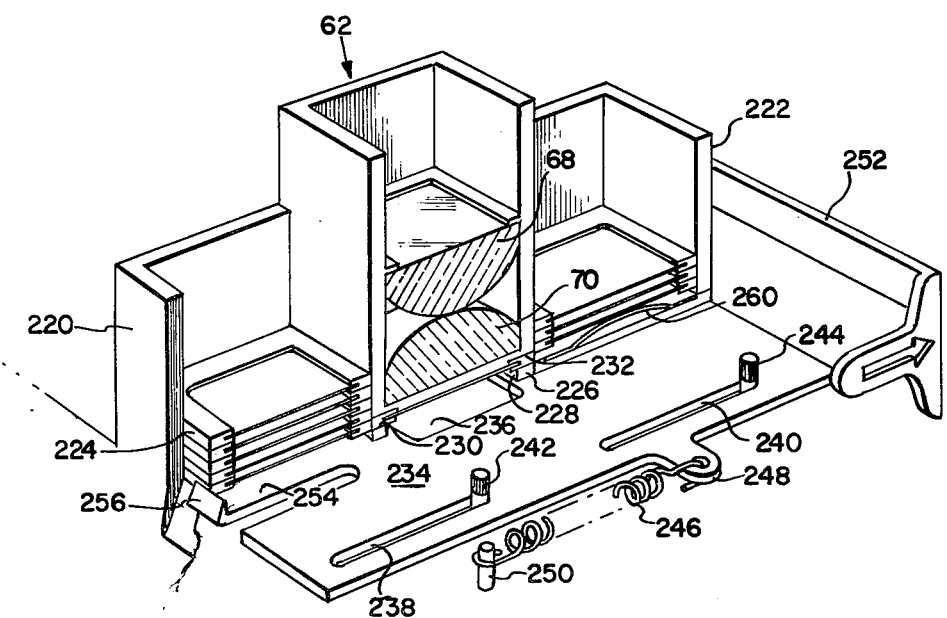
FIG. 8 is a perspective view of a portion of FIG. 7 with parts cut away.

Reference is now made to FIGS. 7 and 8 of the drawings wherein is shown an alternative embodiment of the instant invention. FIG. 7 shows a portion of a projector 10'. Basically, its housing 12' is provided with a pair of film chambers 220 and 222 which are adapted to receive a plurality of 35 mm type transparency film units 224, each of which contains a single image. The height of each chamber is less than that of the section 62 containing the condensing lenses so as to enable the section 62 to be telescopically received within the open end of the housing 14 (not shown) which opening is only slightly larger than the top area of the section 62. Mounted below the condensing lens 70 is a plate 226 having an aperture 228 whose dimensions are substantially equal to those of the image area of each transparency 224. Passageways 230 and 232 are provided between the chamber 220 and the top side of the plate 226 and between the top side of the plate 226 and the chamber 222 for permitting the passage of a transparency 224 from the chamber 220 to its projection position atop of the plate 226 and then into the chamber 222.

The film transporting apparatus of the preferred embodiment is replaced herein by a plate 234 having therein a projection aperture 236 and a pair of elongate slots 238 and 240. The slots 238 and 240 are adapted to receive a pair of pins 242 and 244 extending upwardly from a suitable supporting structure (not shown) for guiding the reciprocating movement of the plate 234. The plate 234 is biased to the left by a spring 246 suitably attached to a flange 248, extending outwardly from the plate 234, and to a pin 250 located on the supporting structure. One end of the plate 234 is attached to a handle 252 while the opposite end of the plate includes an integrally formed resilient film unit engaging member 254. The film unit engaging member 234 normally extends underneath the botton film transparency 224 in the pile located in the chamber 220 with its upturned portion 256 located within a slot 258 in the film chamber 220. The height of the upturned portion 256 is slightly less then the thickness of the outside edge or mount of a transparency therby insuring that only one transparency will be moved at a time from the chamber 220.

FIG. 8 shows a transparency 224 located in its projection position atop the plate 234. After the image has been projected, the handle 252 is pulled to the right thereby moving another transparency from the chamber 220 into the projection position. As the transparency 224 is being moved into its projection position via slot 230, its leading edge engages the transparency located in the projection position and moves it into the chamber 222 via the slot 232. A platen 260 located within the chamber 222 raises the transparency to a position wherein it will not interfere with the passage of a subsequent transparency from its projection position to the chamber 222.

Since certain changes may be made in the above-described embodiment without departing from the scope of the invention herein involved, it is intended that all matter contained in the above description or shown in the accompanying drawings shall be interpreted as illustrative and not in a limiting sense.

What is claimed is:

1. A projector comprising:
   a first housing for substantially enclosing means for transmitting an image in a film unit onto a rear projection screen, said first housing including a section through which the light from a projection bulb may enter said first housing;
   a rear projection screen mounted in one wall of said first housing;
   means mounted within said first housing for transmitting an image onto said rear projection screen, said transmitting means defining an optical path in which said section of said first housing is in alignment with;
   means for supporting a film unit containing a plurality of discrete visible images such that only one of the discrete images is located in alignment with said optical path;
   a second housing having an open end, said second housing including means for supporting a projection bulb in position to direct a substantial portion of its illumination through said open end;
   means for universally coupling said second housing to said first housing, said coupling means being manually adjustable so as to locate the entire surface defining said open end of said second housing in spaced relation to said first housing and in juxtaposed relation to said section of said first housing, whereby when a projection bulb is mounted in said means for supporting a projection bulb, the illumination from the projection bulb may be used for reading when said open end of said second housing is located in spaced relation to said section of said first housing and may be used to project one of the discrete images in the film unit along said optical path and onto said rear projection screen when said open end of said second housing is located in juxtaposed relation to said section of said first housing; and
   means for positioning the film unit relative to said supporting means so as to locate another of the discrete images in the film unit in alignment with said optical path.

2. A projector comprising:
   a first housing for substantially enclosing means for transmitting an image in a film unit onto a rear projection screen, said first housing including a section through which the light from a projection bulb may enter said first housing;

a rear projection screen mounted in one wall of said first housing;

means mounted within said first housing for transmitting an image onto said rear projection screen, said transmitting means defining an optical path in which said section of said first housing is in alignment with;

means for supporting a film unit containing a plurality of discrete visible images such that one of the discrete images is located in alignment with said optical path;

a second housing having an open end, said second housing including means for supporting a projection bulb in position to direct a substantial portion of its illumination through said open end;

means for universally coupling said second housing to said first housing, said coupling means being manually adjustable so as to locate the entire surface defining said open end of said second housing in spaced relation to said first housing and in juxtaposed relation to said section of said first housing, whereby when a projection bulb is mounted in said means for supporting a projection bulb, the illumination from the projection bulb may be used for reading when said open end of said second housing is located in spaced relation to said section of said first housing and may be used to project one of the discrete images in the film unit along said optical path and onto said rear projection screen when said open end of said second housing is located in juxtaposed relation to said section of said first housing; and means for moving said supporting means so as to locate another of the discrete images in the film unit in alignment with said optical path.

3. The projector defined in claim 1 further including means for pivotally connecting said rear projection screen to said one wall of said first housing for movement to a position out of alignment with said optical path such that the image may be projected onto a remote surface.

4. The projector of claim 3 further including means for positioning the film unit relative to said supporting means so as to locate another of the discrete images in the film unit in alignment with said optical path.

5. A projector comprising:

a first housing for substantially enclosing means for transmitting an image in a film unit onto a rear projection screen, said first housing including a section through which the light from a projection bulb may enter said first housing;

a rear projection screen mounted in one wall of said first housing;

means mounted within said first housing for transmitting an image onto said rear projection screen, said transmitting means defining an optical path in which said section of said first housing is in alignment with;

means for supporting a film unit containing a visible image in alignment with said optical path;

means for moving said supporting means so as to locate predetermined areas of a film unit in alignment with said optical path;

means for positioning the film unit relative to said supporting means so as to locate predetermined areas of the film unit in alignment with said optical path, said positioning means including means for releasably holding an end of a film unit to prevent movement thereof relative to said positioning means during movement of said supporting means;

a second housing having an open end, said second housing including means for supporting a projection bulb in position to direct a substantial portion of its illumination through said open end; and means for coupling said second housing to said first housing, said coupling means being manually adjustable so as to locate said open end of said second housing in spaced relation to said first housing and in juxtaposed relation to said section of said first housing, whereby the illumination from a projection bulb when mounted in said second housing may be used for reading when said open end of said second housing is located in spaced relation to said section of said first housing and may be used to project the image of the film unit along said optical path and onto said rear projection screen when said open end of said second housing is located in juxtaposed relation to said section of said first housing.

* * * * *